US008934716B2

(12) United States Patent
Yoon et al.

(10) Patent No.: US 8,934,716 B2
(45) Date of Patent: Jan. 13, 2015

(54) METHOD AND APPARATUS FOR SEQUENCING OFF-LINE CHARACTER FROM NATURAL SCENE

(75) Inventors: Ho Sub Yoon, Daejeon (KR); Ji Eun Kim, Daegu (KR); Kyu Dae Ban, Daejeon (KR); Dong Jin Lee, Chungcheongbuk-do (KR); Jae Hong Kim, Daejeon (KR); Joo Chan Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 162 days.

(21) Appl. No.: 13/599,111

(22) Filed: Aug. 30, 2012

(65) Prior Publication Data

US 2013/0177247 A1    Jul. 11, 2013

(30) Foreign Application Priority Data

Jan. 11, 2012   (KR) .................. 10-2012-0003295

(51) Int. Cl.
*G06K 9/34*   (2006.01)
*G06K 9/46*   (2006.01)

(52) U.S. Cl.
USPC ............ 382/187; 382/171; 382/190; 345/469

(58) Field of Classification Search
CPC .......... G06K 2209/01; G06K 9/00463; G06K 9/00456; G06K 9/3283; G06K 9/00442; G06K 9/34; G06K 9/325; G06K 9/46; G06K 9/4642; G06K 9/723; G06K 9/78; G06K 2009/2045; G06K 9/00865; G07D 7/20; G11B 2220/2562
USPC ......... 382/100, 187, 199, 108, 209, 171, 218, 382/320, 177, 242, 229, 139, 178, 173, 181, 382/312, 137, 190; 345/26, 469, 467, 472, 345/170, 468, 418, 471; 178/18.01

See application file for complete search history.

(56) References Cited

U.S. PATENT DOCUMENTS 4,907,274 A * 3/1990 Nomura et al. ................. 380/30
5,034,991 A * 7/1991 Hagimae et al. .............. 382/209
5,684,891 A * 11/1997 Tanaka et al. ................. 382/178

(Continued)

FOREIGN PATENT DOCUMENTS

JP    2011-146028    7/2011

*Primary Examiner* — Sheela Chawan
(74) *Attorney, Agent, or Firm* — Nelson Mullins Riley & Scarborough LLP; Anthony A. Laurentano, Esq.; Lewis Lee, Esq.

(57) ABSTRACT

Disclosed is a method of sequencing character information in order to increase precision of character recognition. The method includes: a pre-processing that extracts character information from an image to binarize the extracted character information through a predetermined threshold and extracts and thins a center line of the binarized character information; normalizing the pre-processed character information to character information according to a predetermined criteria; and sequencing the normalized character information using structural features including an end point or a divergence point of the character information. The present invention suggests an angle normalization method of input character information, a structural feature position determining method, and a structural feature numeral string generating method to strongly recognize characters configured by various fonts obtained from a natural scene regardless of an angle or a size of the characters.

20 Claims, 10 Drawing Sheets

(56) References Cited

U.S. PATENT DOCUMENTS

| | | | |
|---|---|---|---|
| 6,115,506 A * | 9/2000 | Koshinaka | 382/290 |
| 6,366,699 B1 * | 4/2002 | Kuwano et al. | 382/199 |
| 7,113,620 B2 * | 9/2006 | Shiotani | 382/112 |
| 7,991,231 B2 * | 8/2011 | Kimura et al. | 382/187 |
| 8,139,897 B2 * | 3/2012 | Kojima | 382/298 |
| 2008/0123940 A1 | 5/2008 | Kundu et al. | |

* cited by examiner

FIG. 3A

| A | – | – |
|---|---|---|
| – | E | – |
| – | – | – |

| – | A | – |
|---|---|---|
| – | E | – |
| – | – | – |

| – | – | A |
|---|---|---|
| – | E | – |
| – | – | – |

| – | – | – |
|---|---|---|
| – | E | A |
| – | – | – |

| – | – | – |
|---|---|---|
| – | E | – |
| – | – | A |

| – | – | – |
|---|---|---|
| – | E | – |
| – | A | – |

| – | – | – |
|---|---|---|
| – | E | – |
| A | – | – |

| – | – | – |
|---|---|---|
| A | E | – |
| – | – | – |

| - | - | - |
|---|---|---|
| - | C | 1 |
| - | - | - |

| - | - | 2 |
|---|---|---|
| - | C | - |
| - | - | - |

| - | 3 | - |
|---|---|---|
| - | C | - |
| - | - | - |

| 4 | - | - |
|---|---|---|
| - | C | - |
| - | - | - |

| - | - | - |
|---|---|---|
| 5 | C | - |
| - | - | - |

| - | - | - |
|---|---|---|
| - | C | - |
| 6 | - | - |

| - | - | - |
|---|---|---|
| - | C | - |
| - | 7 | - |

| - | - | - |
|---|---|---|
| - | C | - |
| - | - | 8 |

FIG. 6B

| - | 1 | - |
|---|---|---|
| - | B | 1 |
| - | 1 | - |

| - | - | 1 |
|---|---|---|
| - | B | - |
| 1 | - | 1 |

| - | 1 | - |
|---|---|---|
| 1 | B | 1 |
| - | 1 | - |

| 1 | - | 1 |
|---|---|---|
| - | B | - |
| 1 | - | 1 |

| - | 1 | - |
|---|---|---|
| - | B | 1 |
| 1 | - | - |

| 1 | - | 1 |
|---|---|---|
| - | B | - |
| - | 1 | - |

| - | 1 | - |
|---|---|---|
| - | B | - |
| - | 1 | 1 |

| - | 1 | 1 |
|---|---|---|
| 1 | B | - |
| - | 1 | 1 |

```
- - A - - - -
- A - - - - -
A - - A - -
A - - A - -
A A A A A A A
- - - - A - -
- - - - A - -
```

INPUT IMAGE

```
- - E - - - -
- 6 - - - - -
6 - - - E - -
7 - - - 3 - -
7 1 1 1 B 1 E
- - - - 7 - -
- - - - E - -
```

RESULT OF ASSIGNING END
POINT AND DIVERGENCE POINT

WEIGHT IS NOT REFLECTED : 0 6 6 6 61 1 1 1 93 3 0 1 0 7 0

[FIG. 11]

WEIGHT IS REFLECTED : 0 0 0 6 6 6 61 61 61 61 61 1 1 1 93 93 93 93 93 93 3 0 0 1 0 0 7 0 0

METHOD AND APPARATUS FOR SEQUENCING OFF-LINE CHARACTER FROM NATURAL SCENE

CROSS-REFERENCE TO RELATED APPLICATIONS

This application claims priority to and the benefit of Korean Patent Application No. 10-2012-0003295 filed in the Korean Intellectual Property Office on Jan. 11, 2012, the entire contents of which are incorporated herein by reference.

TECHNICAL FIELD

The present invention relates to a method for analyzing a structure of lines that form a character and representing a stroke formed in a predetermined order in order to recognize the character formed of various fonts appearing in an outside environment to increase the precision of character recognition.

BACKGROUND ART

A structural character recognition method according to a related art is usually used for online input. That is, stroke information of a character which is information detected by an electronic pen or touch is continuously and sequentially received and the structural features of the strokes are analyzed and modeled to recognize the information. Even when individuals have various note-taking habits, the structures of the strokes are uniform so that the above structural character recognition method is preferable.

In contrast, when the characters input from an image are recognized (OCR), a statistic recognition method using a neural network is mainly used. When a font is uniform or limited, the statistic recognition method has high recognition rate and is mainly used for text recognition using a scanner. However, in case of a character included in an external image of a natural environment having no specific font, the statistic recognition method is not suitable for a recognition method because it is hard to train various changes of fonts and thus the high recognition rate may not be expected.

SUMMARY OF THE INVENTION

The present invention has been made in an effort to provide a method of pre-processing character information included in a natural scene using a structural character recognition method which is mainly used in an on-line recognition method in order to recognize characters configured by various fonts present in the natural scene, detecting the structural feature point including an end point and a divergence point of the pre-processed character information, and then assigning the corresponding structural feature code thereto to generate as a numeral string.

An exemplary embodiment of the present invention provides a method of sequencing character information, including a pre-processing step in which a pre-processing unit extracts character information from an image to binarize the extracted character information through a predetermined threshold value and thins the binarized character information to be information with a predetermined thickness; a step in which a normalizing unit normalizes the character information pre-processed in the pre-processing step to character information according to a predetermined criteria; and a sequencing step in which a sequencing unit converts the normalized character information into information numeralized using structural features including an end point or a divergence point of the character information.

The normalizing of the character information includes: a step in which an end point code assigning unit detects an end point of a character stroke having one adjacent point among points configuring the pre-processed character information; and a step in which a character information rotating unit corrects an inclined angle of the character information using the detected end point in accordance with a predetermined direction.

The step of detecting the end point preferably includes: a step in which the end point code assigning unit assigns an end point code to the end point detected from the character information; and a step in which the end point code assigning unit sets a visiting order of end points according to a predetermined order for end points to which the end point codes are assigned.

In the step of correcting the inclined angle, a character information rotating unit rotates the character information in a direction where an angle formed by a reference point and predetermined n directions using one of the detected end points as the reference point is minimized.

Before the step of sequencing using the structural feature, the method further includes a step in which the code assigning unit assigns a chain code that indicates a heading direction of a stroke or a divergence point that indicates the crossing of the strokes to each of points configuring the normalized character information. In the step of sequencing, the sequencing unit sequences the character information to which the code or the point is assigned using the structural feature.

The chain code or the divergence point is assigned such that the code assigning unit visits each of the points configuring the character information in accordance with a predetermined visiting order to assign the chain code or the divergence point to the detected end points.

The chain code or the divergence point is assigned such that when no end point is detected in the step of detecting the end point, the code assigning unit visits the points using a point that is positioned relatively at a left-upper most side, among the points included in the character information, as a starting point in accordance with a predetermined visiting order to assign the chain code or the divergence point.

The points of the character information are visited in accordance with the set or determined visiting order such that the code assigning unit visits continuous points to the starting point using a depth first search method that a point whose relative position is the left-upper most has a priority.

In the step of assigning the chain code or the divergence point, the code assigning unit assigns a curved point to a visited point when an angle formed by a current heading direction of a stroke and a subsequent heading direction of the stroke is larger than a predetermined threshold value with respect to the visited point in accordance with the visiting order.

The angle that is compared with the threshold value is a smaller angle of angles formed by the current heading direction of the stroke and the subsequent heading direction of the stroke.

The sequencing step includes: a structural feature code setting step in which a structural feature code generating unit sets a numeral code corresponding to an end point code, a divergence point or a curved point assigned to the structural feature of the character information; and a numeral string generating step in which a numeral string generating unit generates a structural feature code which is converted into a numeral string by applying a weight to the set structural feature code.

In the structural feature code generating step, the structural feature code generating unit sets the structural feature as the numeral code in accordance with a predetermined numeralization representation method.

In the numeral string generating step, the numeral string generating unit sequences the numeral code assigned to the character information in accordance with the visiting order to generate a numeral string.

The weight is applied in the numeral string generating step such that the numeral string generating unit repeats the numeral codes set for the structural feature of the generated numeral string using a distance between the structural feature positions.

The method further includes: a modeling step in which a modeling unit generalizes a numeral string for the character information using the numeral string generated in the sequencing step.

Another exemplary embodiment of the present invention provides an apparatus of sequencing character information, including: a pre-processing unit that extracts character information from an image to binarize the extracted character information through a predetermined threshold value and thins the binarized character information to be information with a predetermined thickness; a normalizing unit that normalizes the character information pre-processed in the pre-processing unit to character information according to a predetermined criteria; a code assigning unit that assigns a chain code that indicates a heading direction of a stroke or a divergence point that indicates the crossing of the strokes to each of points configuring the normalized character information; and a sequencing unit that converts the character information to which the code or the point is assigned into information numeralized using structural features including an end point or a divergence point of the character information.

The normalizing unit includes: an end point code assigning unit that detects an end point of a character stroke having one adjacent point among points configuring the pre-processed character information to assign an end code; and a character information rotating unit that corrects an inclined angle of the character information in accordance with a predetermined angle using an end point to which the end point code is assigned.

The sequencing unit includes: a structural feature code generating unit that sets a numeral code corresponding to an end point code, a divergence point, or a curved point that is assigned for the structural feature of the character information; and a numeral string generating unit that applies a weight to the generated structural feature code to generate a structural feature code which is converted into a numeral string.

The apparatus further includes: a modeling unit that generalizes a numeral string for the character information using the numeral string generated in the sequencing step.

Yet another exemplary embodiment of the present invention provides a method of recognizing character information, including:

a step in which a character information inputting unit receives image information including character information; a pre-processing step in which a pre-processing unit extracts character information from the input image information to binarize the extracted character information through a predetermined threshold value and extract and thin a center line of the binarized character information; and a step in which a character information recognizing unit applies a weight to a structural feature point including an end point, a divergence point, and a curved point to convert the character information into numeral string information in accordance with a predetermined algorithm to recognize the pre-processed character information using trained modeling information.

According to exemplary embodiments of the present invention, an on-line character recognition method according to a related art may be applied to a method of recognizing an off-line character obtained from an image so that characters having various fonts that are present in a natural environment are easily recognized. Further, in order to apply the advantages of structural character recognition regardless of the font to the character information input from the image, the present invention suggests an angle normalization method of input character strings, a structural feature position determining method, and a structural feature numeral string generating method to strongly recognize characters configured by various fonts obtained from a natural scene regardless of an angle or a size of the characters.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 3A is an exemplary view illustrating a 3 by 3 mask for detecting an end point of character information according to an exemplary embodiment of the present invention.

FIG. 3B is an exemplary view illustrating an example that an end point code of the character information is assigned according to an exemplary embodiment of the present invention.

FIG. 6A is an exemplary view illustrating an eight way code for assigning a chain code according to an exemplary embodiment of the present invention.

FIG. 6B is an exemplary view illustrating a mask for determining a divergence point according to an exemplary embodiment of the present invention.

FIG. 11 is an exemplary view illustrating a number string in which a weight is applied to a structural feature code of the number string generated according to an exemplary embodiment of the present invention.

Figure 1:
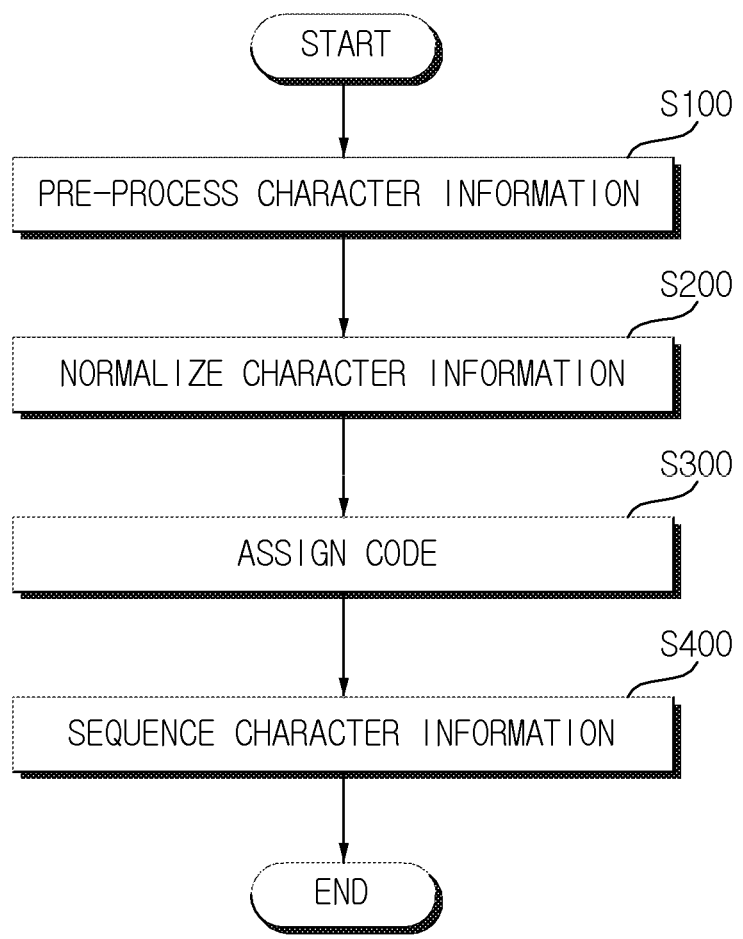
FIG. 1 is a flowchart illustrating a method sequencing of character information according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

FIG. 1 is a flowchart illustrating a method of sequencing character information according to an exemplary embodiment of the present invention.

Referring to FIG. 1, a method of sequencing character information according to an exemplary embodiment of the present invention includes a pre-processing step S100 in which a pre-processing unit 110 receives character information included in image information to perform a binarization and thinning process on the character information, a normalizing step S200 in which a normalizing unit 200 normalizes the pre-processed character information, a step S300 in which a code assigning unit 300 assigns a point to the normalized character information, and a step S400 in which a sequencing unit 400 sequences structural features including an end point or a divergence point using a point that is assigned to the normalized character information.

In the pre-processing step S100 of the character information, the pre-processing unit 110 receives the character information included in the image information to binarize the character information and thin the binarized information. The binarization of the character information is a process of setting a pixel having a lower value than a threshold value to a black (0) and a pixel having a higher value than a threshold value to a white (255) and preferably represents the image information with contrast of black and white. The binarization according to the present embodiment may include a P-Tile method (simple threshold method), a mode method, average binarization, iterative binarization, and adaptive binarization. According to the P-Tile method, an area percentage point P % in a contrast histogram is set as a threshold value when the area percentage occupied by the object in the image is known. According to the mode method, a contrast point corresponding to a valley between peaks in the histogram that represents a distribution of pixel values according to the contrast value is set as a threshold value of binarization. In the average binarization, an average of all pixels in the image is calculated and set as a threshold value. In the iterative binarization, an approximate threshold value is set as a starting point and then the threshold value is gradually and repeatedly improved. In the adaptive binarization, a histogram for a part of an image rather than a histogram for the entire image is used to calculate a threshold value for the part of an image.

The character information is thinned such that the information concerning lines included in the binarized character information is converted into lines having a predetermined thickness. More specifically, the thick lines included in the character information are converted into information concerning lines that form one pixel to extract a center line having a thickness that is formed by one pixel.

The normalizing step S200 of the pre-processed character information is a step in which the normalizing unit 200 converts the pre-processed character information into information that is normalized in accordance with a predetermined criteria. The normalizing step S200 will be described in detail with reference to FIG. 2.

Figure 2:
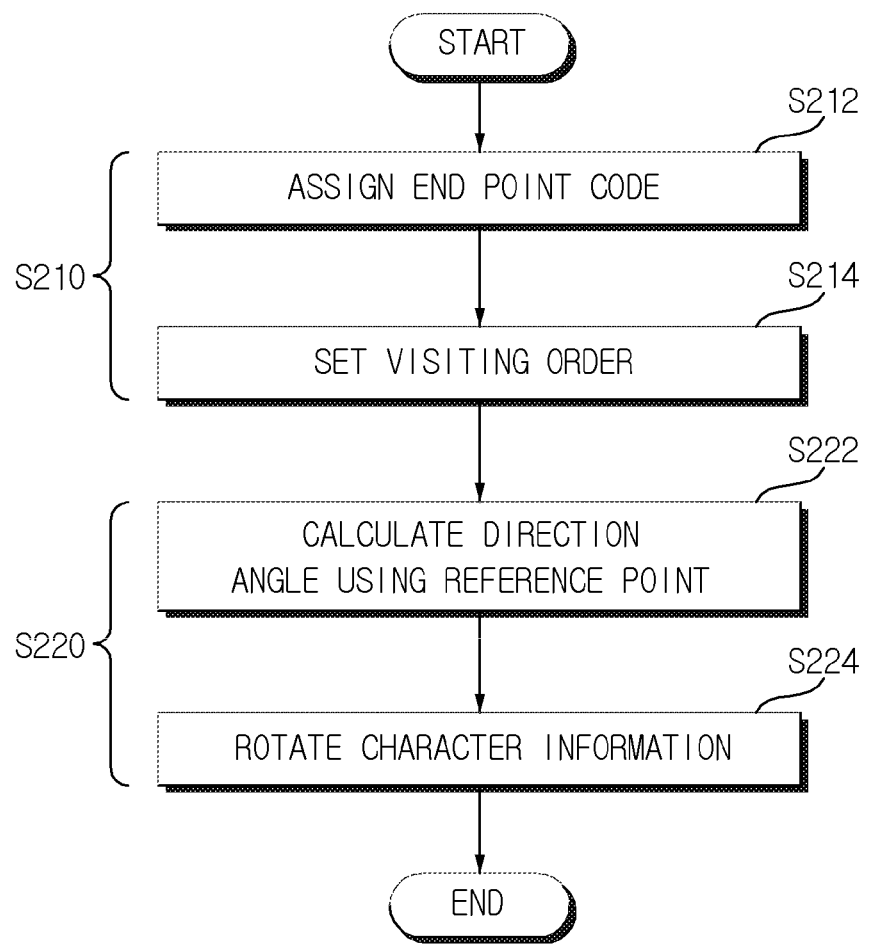
FIG. 2 is a flowchart illustrating a normalizing step of character information according to an exemplary embodiment of the present invention.

FIG. 2 is a flowchart illustrating the normalizing step S200 of character information according to an exemplary embodiment of the present invention. Referring to FIG. 2, the normalizing method of character information according to the exemplary embodiment includes a step S210 in which an end point code assigning unit 210 detects an end point of a stroke that configures a character included in the character information and a character information correcting step S220 in which a character information rotating unit 220 corrects an inclined angle of character information using the detected end point. The end point code detecting step includes a step S212 in which the end point code assigning unit 210 detects the end point code to assign an end point code and a visiting order setting step S214 in which the end point code assigning unit 210 to which the end point code is assigned sets an order of visiting the end points.

The end point code assigning step S212 is a step in which the end point code assigning unit 210 detects an end point of a stroke included in the character information and assigns an end point code indicating that the detected point is an end point. The detecting of the end point according to the exemplary embodiment will be described with reference to FIG. 3A. The end point is preferably a position having only one adjacent point when eight directions are searched using itself as a reference point in the stroke included in the character information. The end point is preferably detected by scanning all points configuring the strokes included in the character information using 3 by 3 masks shown in FIG. 3A. When one point among points corresponding to eight directions of A with respect to one point E exists, the point is preferably the end point. An end point code that indicates the end point is preferably assigned to the detected end point. FIG. 3B is an exemplary view illustrating an example of the character information to which an end point code is assigned according to an exemplary embodiment of the present invention. FIG. 3B shows that an end point code E is assigned into four end points detected from the character information.

Figure 3C:
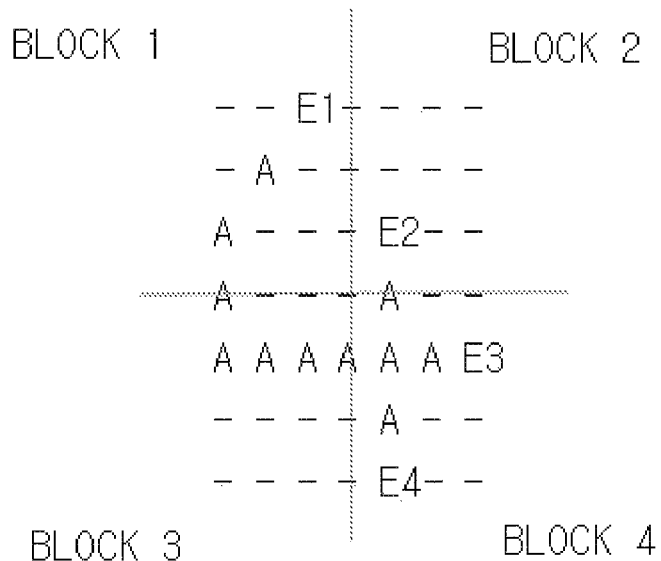
FIG. 3C is an exemplary view illustrating an example that an order according to a predetermined order is assigned to an end point code of the character information according to an exemplary embodiment of the present invention.

The step S214 in which the end point code assigning unit 210 sets the order of visiting the end point of the character information to which the end point code is assigned sets the visiting order in accordance with a predetermined order of the end points in which the end point codes are set. The visiting order in accordance with the predetermined order will be described in detail with reference to FIG. 3C. Referring to FIG. 3C, the entire area of the character information shown in FIG. 3B is divided into four blocks and a left-upper most end point in each of the blocks has preferably a relative priority. The order of the blocks is preferably in the order of a block 1, a block 2, a block 3, and a block 4. Referring to FIG. 3C, the character information whose end point is detected visits the end points in the order of E1, E2, E3, and E4.

The character information correcting step S220 includes a step S222 in which the character information rotating unit 220 calculates a direction angle using one reference point among the end points and a step S224 in which the character information rotating unit 220 rotates the character information using the calculated direction angle.

In the step S222 of calculating the direction angle using the reference point, the character information rotating unit 220 calculates an angle of the reference point with respect to predetermined n directions using one of the end points as the reference point. The angle is preferably determined to minimize the angle formed by the eight directions of the center point of the character information and one reference point of end points. The reference point according to the exemplary embodiment is preferably an end point whose visiting order is the first. The center point is preferably an average position with respect to the positions of all points of the character information. As described in detail referring to FIG. 4, the predetermined n directions are preferably eight directions where the center point P and a displacement when n is 8 form $\pi/4$. The direction angle is preferably calculated so as to be an angle $\theta$ of eight directions with respect to the center point p using the end point E1 whose visiting order is the first as the reference point.

Figure 4:
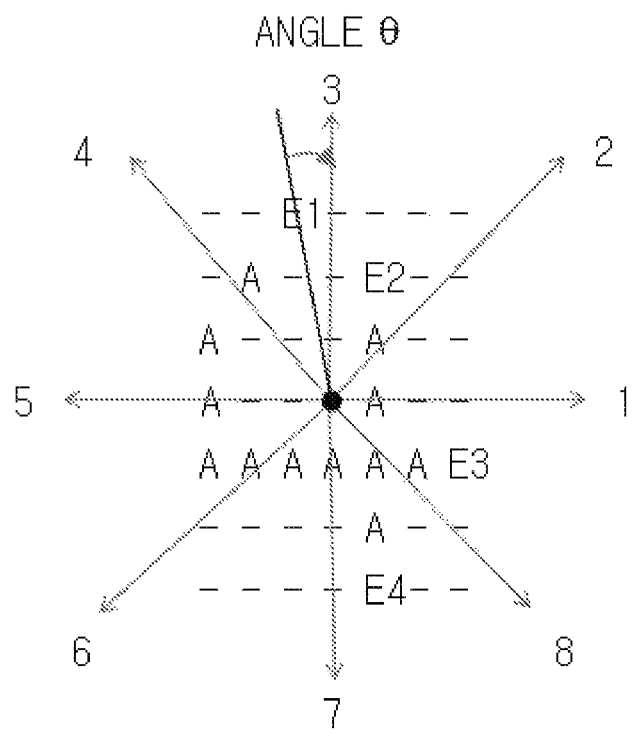
FIG. 4 is an exemplary view illustrating an example of calculating an angle for correcting an angle of character information according to an exemplary embodiment of the present invention.

In the step S224 of rotating the character information using the calculated direction angle, the character information rotating unit 220 rotates the input character information in a normalized form which is not inclined. The character information is preferably rotated so as to minimize the angle using the angle calculated in the step S222 of calculating the direction angle. The direction that minimizes the angle is preferably a direction for a minimum angle among $\theta$ calculated in the step S222 of calculating the direction angle. Referring to FIG. 4, an angle $\theta$ formed by the direction 3 and the end point E1 is a minimum angle and the direction 3 is a direction that minimizes the angle. Therefore, the entire character information is preferably rotated so that the end point E1 of the character information corresponds to the direction 3.

In the step S300 of assigning the code into the normalized character information, the code assigning unit 300 assigns a chain code that indicates a heading direction of the stroke or a divergence point that indicates that the strokes cross to each other to the points configuring the character information normalized in the step S200 of normalizing the character information. The heading direction of the stroke is preferably a relative position on a stroke of a subsequent point with respect to a feature point in the stroke included in the character information and points configuring the stroke. As described in detail referring to FIG. 6A, the chain code is preferably a code that represents the feature point of the stroke configuring the character information and the relative position information of a subsequent point on the stroke with numbers. Preferably, the check code represents the relative position of a subsequent point of a specific point C in one to eight directions. What the strokes cross to each other means that the strokes configuring the character information may share at least one point. The crossing of the strokes according to the exemplary embodiment means that the feature point included in the character information is diverged into at least three points. The divergence point is diverged with respect to the feature point. Referring to FIG. 7B, a divergence point B is preferably assigned to a point at which the strokes cross to each other.

The chain code or the divergence point is preferably assigned to visit each of points configuring the character information in the visiting order set for the detected end point. The visiting order will be described in detail with reference to FIG. 5.

Figure 5:
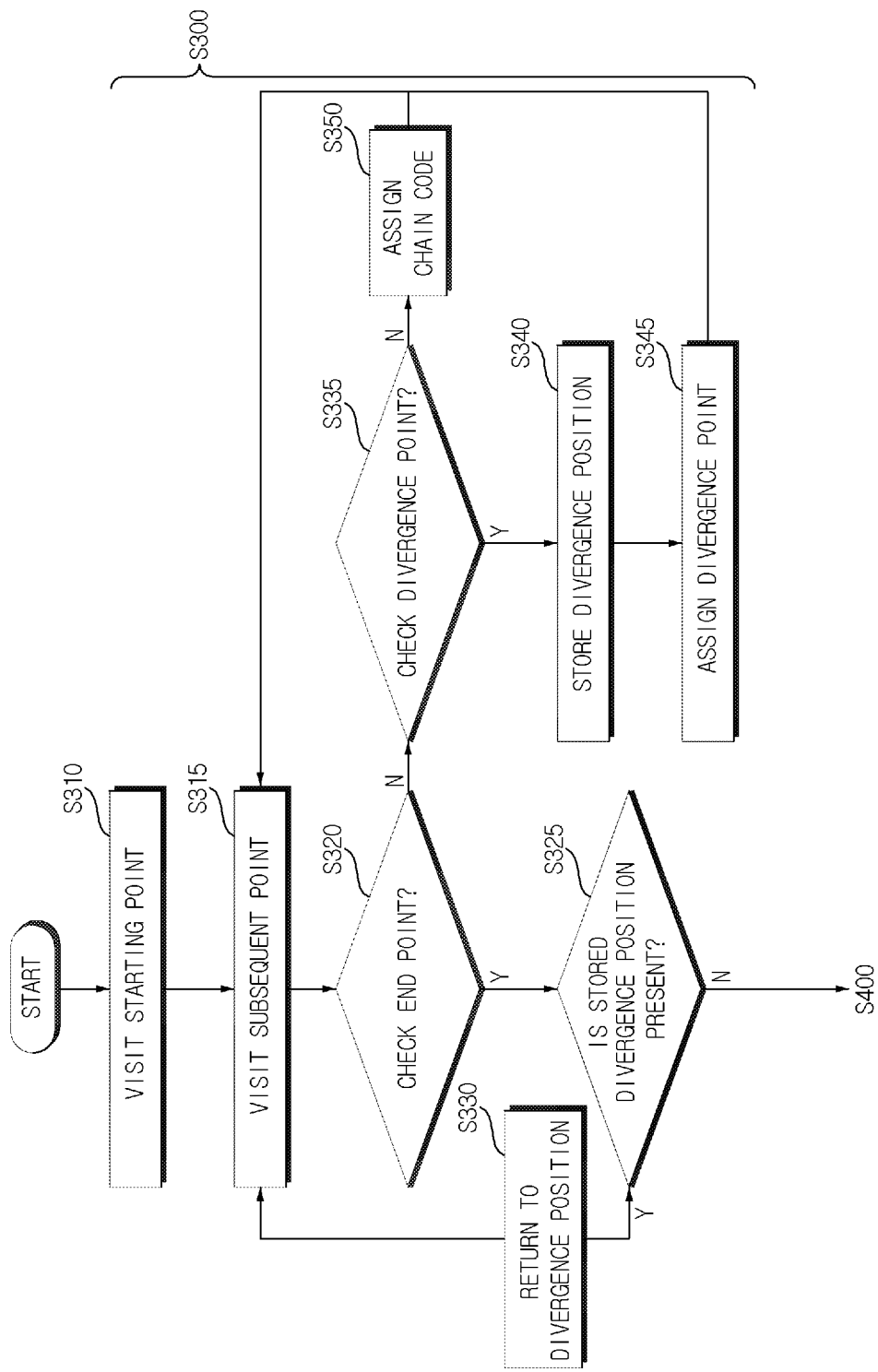
FIG. 5 is a flowchart illustrating a method of assigning a code or a point according to an exemplary embodiment of the present invention.

FIG. 5 is a flowchart illustrating a method that the code assigning unit 300 assigns a code or a point according to an exemplary embodiment of the present invention.

Referring to FIG. 5, a method that the code assigning unit 300 assigns the code or the point according to the exemplary embodiment includes a step S310 in which the code assigning unit 300 visits a starting point using one of the end points as the starting point, a step S315 of visiting a subsequent point of the starting point, a step S320 of checking whether the subsequent point is the end point, a step S325 of checking the presence of the stored divergence position when the subsequent point is the end point, a step S330 of returning to the divergence position when the stored divergence position is present, and a step S315 of visiting a subsequent point which is not visited in the returned divergence position. The method further includes a step S335 of checking whether the subsequent point is the divergence point when the subsequent point is not the end point, a step S340 of storing the position of the divergence point when the subsequent point is the divergence point, a step S345 of assigning the divergence point, a step S315 of visiting a point subsequent to the divergence point, a step S350 of assigning a chain code when the subsequent point is not the divergence point, and a step S315 of visiting a subsequent point. When the stored divergence position is not present in the step S325 of checking the presence of the stored divergence position, the visiting is completed.

According to the exemplary embodiment, in the step S310 of visiting the starting point, the code assigning unit 300 preferably visits an end point whose visiting order is set to be the first in the step S214 of setting the visiting order of the character information to which the end point is assigned. Referring to FIG. 3C, it is preferable to visit the end point E1 whose visiting order is set to be the first as the starting point. In case of the character information in which the end point is not present, for example, in case of number 8, the left-upper most part of the character information is set to be an E1 position.

In the step S315 of visiting a point subsequent to the starting point, the code assigning unit 300 visits a subsequent point according to the predetermined visiting order. As the predetermined visiting order, a depth first search method that a point whose relative position is the left-upper most has a priority in accordance with the visiting order of the end point set in the step S214 of setting the visiting order of the end point is used. According to the depth first search method, after visiting one peak point, a peak point which is next to the above peak point and has not been visited is selected to repeat the above sequences. According to the exemplary embodiment, a point next to the starting point is visited. However, if the starting point is the divergence point, a point whose relative position is the left-upper most is prioritized to be visited. Referring to FIG. 7B, the point whose relative position is the left-upper most is prioritized so as to visit the peak point (a peak point to which a chain code is set to 3) which is located at the left-upper most side among the peak points which have not been visited in the case of the peak point to which the divergence point B is assigned.

The step S320 of checking whether the subsequent point is the end point is a step in which the code assigning unit 300 checks whether a point visited as a subsequent point is an end point. If the subsequent point is the end point, presence of the divergence position is confirmed in the step S325 of checking the presence of the stored divergence position. If the subsequent point is not the end point, in the step of checking whether the subsequent point is the divergence point which will be described below, it is checked whether the subsequent point is the divergence point (S335).

In the step S335 of checking whether the subsequent point is the divergence point, if the point visited by the code assigning unit 300 is not the end point, it is checked whether the subsequent point is a divergence point which is diverged into three or more points. If the subsequent point is a divergence point, the code assigning unit 300 stores the divergence position (S340), the divergence point is assigned to the visited point (S345). If the subsequent point is not a divergence point, the code assigning unit 300 assigns a chain code (S350) and then visits a subsequent point (S315).

When the point visited by the code assigning unit 300 is the divergence point, the step S340 of storing the divergence position preferably stores the divergence position in order to visit a second prioritized point among the above-mentioned priorities. According to the exemplary embodiment, the divergence position is preferably stored using a stack structure according to the LIFO (last in first out) manner.

As described above, the step S345 of assigning the divergence point to the visited point preferably assigns the divergence point B to a point at which the strokes cross in FIG. 7B.

Figures 6C, 7A:
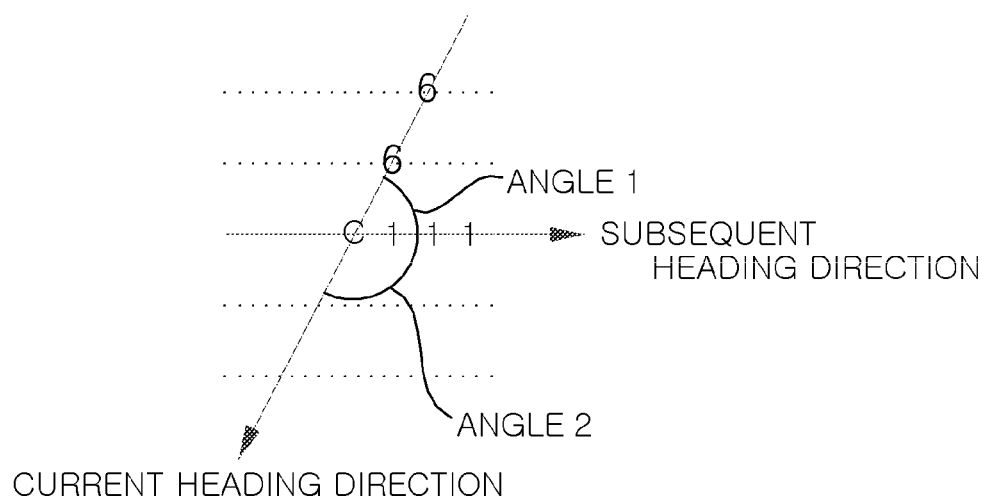
FIG. 6C is an exemplary view illustrating a 5 by 5 mask for determining a curved point according to an exemplary embodiment of the present invention.
FIGS. 7A and 7B is an exemplary view illustrating a result that a code and a point are assigned to character information according to an exemplary embodiment of the present invention.
Figures 7B, 8:
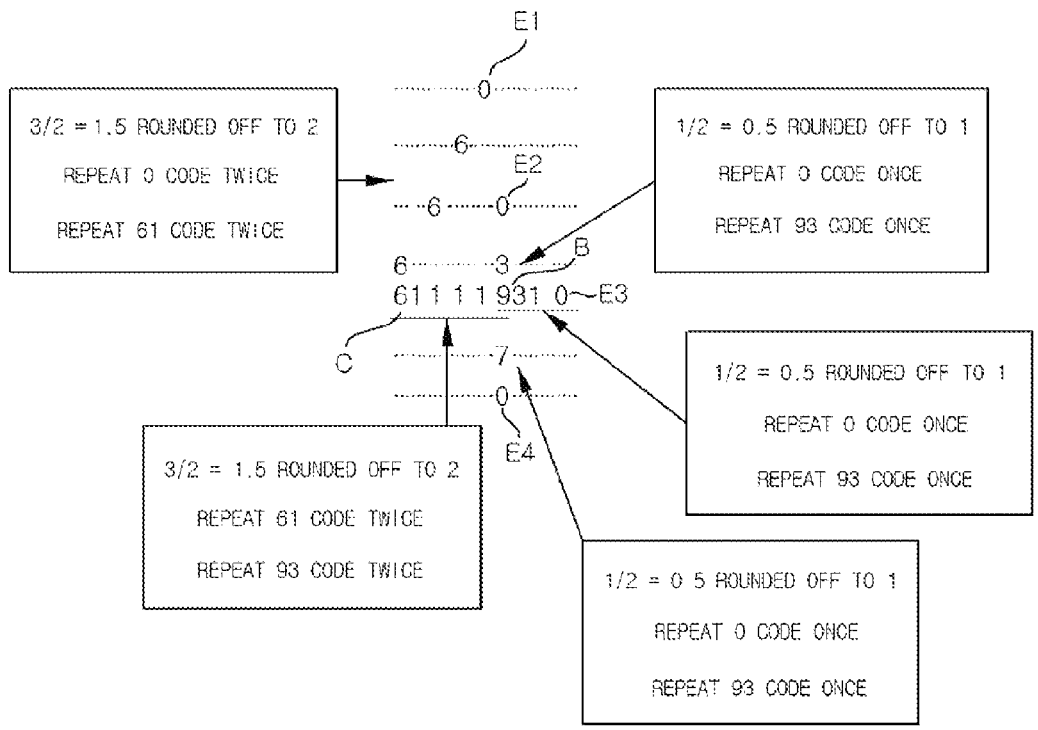
FIG. 8 is an exemplary view illustrating an example that a structural feature code is assigned to a structural feature point of character information according to an exemplary embodiment of the present invention.

The step S350 of assigning a chain code preferably assigns a numeral code of the chain code of FIG. 6A to each of points in FIG. 7A. The step S350 of assigning a chain code includes a step S355 of assigning a curved point.

In the step S355 of assigning a curved point, the code assigning unit 300 preferably assigns the curved point to the visited point when an angle formed by a current heading direction of the stroke and a subsequent heading direction of the stroke with respect to the visited point is larger than a predetermined threshold value. Referring to FIG. 6C, when the difference between the current heading direction of the stroke and the subsequent heading direction of the stroke is 45 degree larger than a predetermined threshold value with respect to the currently visited point, the curved point is assigned to the visited point using a 5 by 5 sized mask shown in FIG. 6C. The current heading direction is the sixth direction according to the chain code shown in FIG. 6A, but the subsequent heading direction is the first direction. Therefore, since the angle difference between the heading directions is the same as the threshold value, the curved point C is preferably assigned to the visited point.

A smaller angle between angles formed by the previous heading direction of the stroke and the subsequent heading direction of the stroke is preferably compared with the threshold value. The smaller angle is preferably an angle 1 between an angle 1 and an angle 2 which are formed by the current heading direction and the subsequent heading direction in FIG. 6C.

In the step S320 of checking whether the subsequent point is the end point, the code assigning unit 300 checks the presence of the stored divergence position when the subsequently visited point is the end point (S325). In the step S325 of checking the presence of the stored divergence position, the code assigning unit 300 checks the presence of the divergence position stored in the step S340 of storing the divergence position. When the divergence position is present, the code assigning unit returns to the divergence position (S330), and then visits a point which has not been visited with respect to the returned divergence position (S315). In the step S325 of checking the presence of the divergence position, if the stored divergence position is not present, it is determined that all points configuring the character information are visited and then the visiting is completed.

In the step S330 of returning to the divergence position, the code assigning unit 300 returns to the divergence position in order to visit a point which has not been visited in the stored divergence position. The step S315 of visiting the subsequent point visits a point which has not been visited using the divergence position returned in the step S330 of returning to the divergence position as a new starting point according to the order of priority (S315).

A step S400 of sequencing a structural feature including an end point or a divergence point using a point which is assigned to the normalized character information will be described with reference to FIG. 9.

Figures 9, 10:
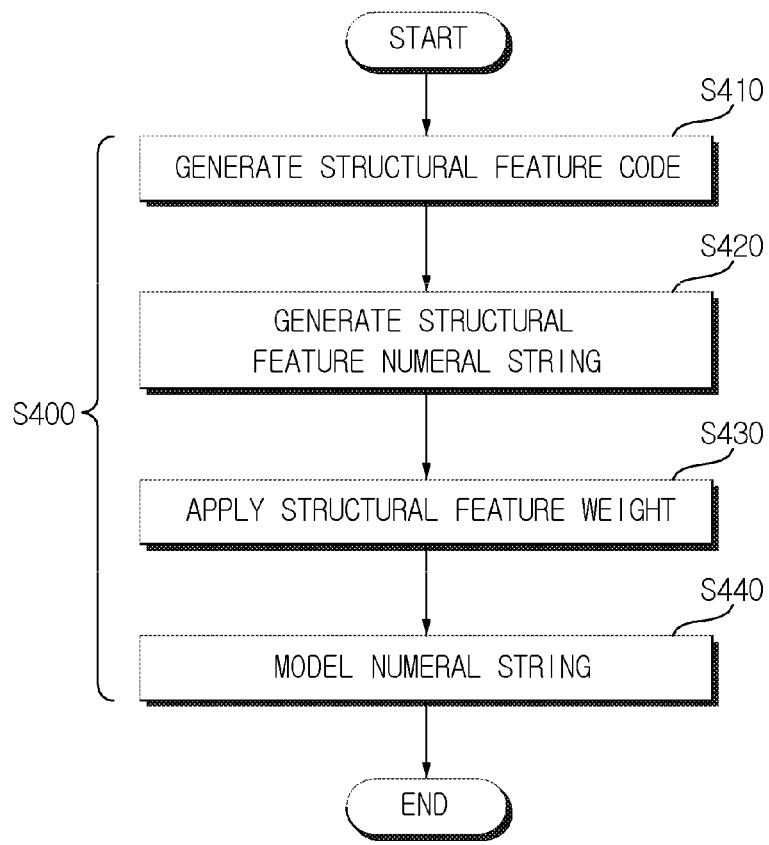
FIG. 9 is a flowchart illustrating of a process of sequencing character information as a structural feature code according to an exemplary embodiment of the present invention.
FIG. 10 is an exemplary view illustrating a number string generated in a number string generating step of character information according to an exemplary embodiment of the present invention.

FIG. 9 is a flowchart illustrating of a process of sequencing character information as a structural feature code by a sequencing unit 400 according to an exemplary embodiment of the present invention. The step S400 of sequencing the structural feature according to the exemplary embodiment includes a step S410 of generating a structural feature code, a step S420 of generating a structural feature numeral string, a step S430 of applying a weight for the structural feature to the generated numeral string, and a modeling step S440 of generalizing the weighted numeral string with respect to the character information.

The structural feature point is preferably characteristics of a stroke including an end point, a curved point, and a divergence point of the character information. In the step S410 of generating the structural feature code, the structural feature code generating unit 410 preferably generates a numeral code corresponding to a code or a point assigned to the structural feature point of the character information. The numeral code is preferably generated such that numeral information corresponding to the code or the point of the structural feature point is generated in accordance with a predetermined numeralization representing method. According to the exemplary embodiment, the predetermined numeralization representing method assigns a numeral code "0" to the end point to which the end point code E is set. Further, the divergence points to which the divergence code B is assigned are preferably assigned in accordance with the number of divergence positions, for example, 92 when the number of divergence positions is two, 93 when the number of divergence positions is three, and 94 when the number of divergence positions is four. A chain code value of the current heading direction and a chain code value of the subsequent heading direction are preferably assigned to the curved point. FIG. 8 shows a result that the end point of the character information is set to '0', the divergence point is set to '93', the curved point is set to '61', as the structural feature code.

In the step S420 of generating a structural feature numeral string, a numeral string generating unit 420 preferably sequences the numeral code which is assigned to the character information in accordance with the visiting order to generate the numeral string. Referring to FIG. 10, the step S420 of generating a structural feature numeral string preferably represents the character information using the numeral code generated in the step S410 of generating the structural feature code and the chain code assigned in the step S350 of assigning the chain code with the numeral strings in accordance with the above-mentioned visiting order.

In the step S430 of applying a weight for the structural feature to the generated numeral string, the numeral string generating unit 420 preferably repeats the numeral code set for the structural feature point using a distance between the structural feature positions. The numeral string which is formed only by chain codes represents only direction information between adjacent two positions, so that the entire structure of a character is not reflected. The step S430 of applying a weight for the structural feature to the generated numeral string defines an end point, a divergence point, and a curved point in addition to the chain code and the above points represent an important structure of a character. Therefore, it is preferable to repeatedly assign a numeral code using a weight, which is different from the chain code.

The weights of the structural feature points are preferably set by repeating the numeral codes of the structural feature points. In the exemplary embodiment, the weights preferably use the distance between the positions of the structural feature points. In other words, if there are eight chain codes between the end points and end point, each of the end points is set to be repeated four times. Alternatively, in the pattern of end point—eight chain codes—curved point—six chain codes—end point, generally, it is represented by five (one+four) end points—eight chain codes—eight (four+one+three) curved points—six chain codes—four (one+three) end points. Here, the number 1 refers to its own structural point. As described in detail with reference to FIG. 11, the numeral code of the end point E1 is repeatedly represented 3/2 times more, the numeral code of the end point E2 is repeatedly represented 1/2 times more, the numeral code of the end point E3 is repeatedly represented 1/2 times more, and the numeral code of the end point E4 is repeatedly represented 1/2 times more. The repetition frequency is preferably rounded off. The curved points C are repeated 3/2 and 3/2 times more, respectively, and the divergence points B are repeated 3/2, 1/2, 1/2, and 1/2 times more. The final order string to which a weight is applied according to the exemplary embodiment is shown in FIG. 11. In FIG. 11, the bold numbers refer to the repeated numeral code according to the weight.

In the modeling step S440 of generalizing the weighted numeral string with respect to the character information, if a numeral string of a character to be recognized is generated, a modeling unit 500 models at least 50 training data for numeral strings of character strings to be trained using a HMM (Hiden Markov Model) method. If a user wants to recognize a number according to the exemplary embodiment, 10 HMM models that are trained 50 times for every number of 0 to 9 are generated and a HMM based recognition device recognizes numbers through a corresponding model from an input character (number) image regardless of the length of the sequence string.

Figure 12:
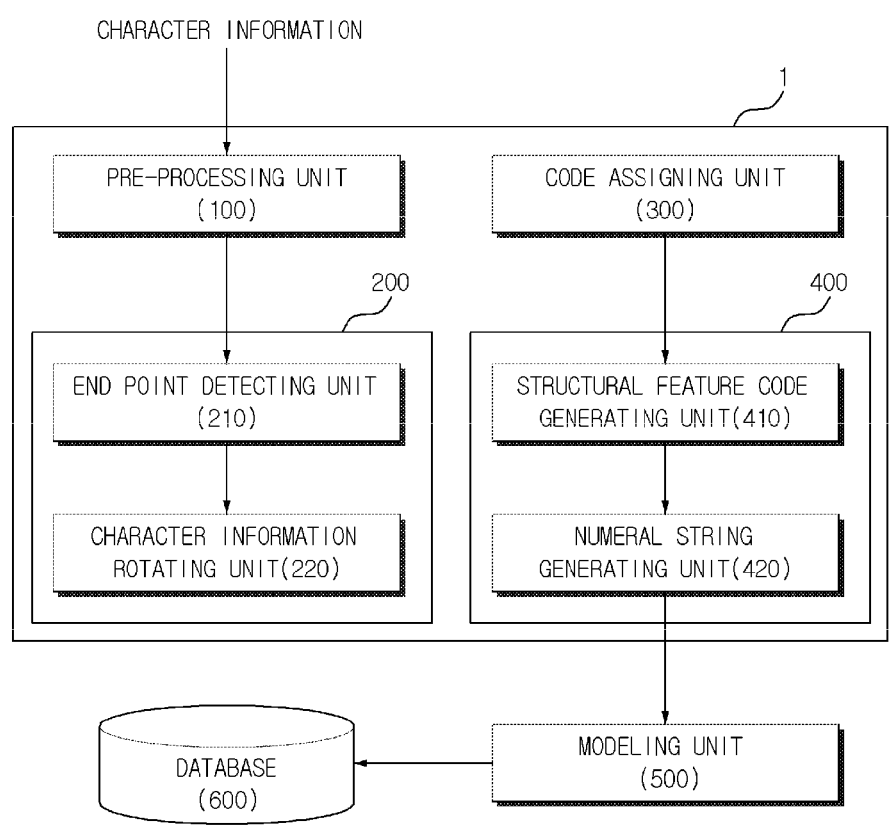
FIG. 12 is a block diagram illustrating an apparatus of sequencing character information according to an exemplary embodiment of the present invention.

FIG. 12 is a block diagram illustrating a sequencing apparatus of character information according to an exemplary embodiment of the present invention. Referring to FIG. 12, the sequencing apparatus 1 of the character information according to the exemplary embodiment includes a pre-processing unit 100 that receives and pre-processes a character image, a normalizing unit 200 that normalizes character information as character information according to a predetermined criteria, a code assigning unit 300 that assigns a chain code that indicates a heading direction of a stroke or a divergence point that indicates the crossing of the stroke to points configuring the character information, a sequencing unit 400 that sequences the character information to which the code or the point is assigned using structural features including an end point or a divergence point, a modeling unit 500 that generalizes a numeral string for the character information using the numeral string generated in the sequencing unit, and a database unit 600 that stores or manages the modeled numeral strings.

The pre-processing unit 100, as described above, extracts character information from the image and binarizes the extracted character information through a predetermined threshold value and then extracts and thins a center line of the binarized character information (S100).

The normalizing unit 200 includes an end code assigning unit 210 that detects an end point of a character stroke having one adjacent point among points configuring the pre-processed character information to assign an end point code and a character information rotating unit 220 that corrects an inclined angle of the character information in accordance with a predetermined angle using an end point to which an end point code is assigned.

The end point code assigning unit 210 detects the end point of the stroke included in the character information and assigns an end point code that indicates an end point to the detected end point (S212) and sets a visiting order in accordance with a predetermined order of the end points to which the end points are assigned (S214).

The character information rotating unit 220 calculates an angle formed by a reference point and predetermined n directions using one of end points as the reference point (S222) and rotates the input character information with a non-inclined normalized format (S224).

The code assigning unit 300 assigns a chain code that indicates a heading direction of a stroke, a divergence point that indicates the crossing of the stroke, or a curved point that indicates that the heading direction of the stroke is changed more than a predetermined threshold angle to each of the points configuring the normalized character information (S300). The code assigning unit 300 assigns a code or a point to a visited point by visiting a subsequent point according to a predetermined visiting order. As the predetermined visiting order, a depth first search method that a point whose relative position is the left-upper most has a priority as described above is used.

The sequencing unit 400 includes a structural feature code generating unit 410 that generates a structural feature code and a numeral string generating unit 420 that generates a numeral string using the structural feature code and applies a weight for the structural feature to the generated numeral string.

The structural feature code generating unit 410 generates a numeral code corresponding to a code assigned to the structural feature point of the character information (S410). The structural feature point is preferably characteristics of a stroke including an end point, a curved point, and a divergence point of the character information.

The numeral string generating unit 420 sequences the numeral code which is assigned to the character information in accordance with the visiting order to generate the numeral string (S420) and defines an end point, a divergence point, and a curved point in addition to the chain code. Since the above points represent an important structure of a character, the numeral string generating unit 420 repeatedly assigns a numeral code using a weight, which is different from the chain code (S430).

If a numeral string of a character to be recognized is generated, the modeling unit 500 models at least 50 training data for numeral strings of character strings to be trained using a HMM (Hiden Markov Model) method (S440).

The database unit 600 stores and manages information of models for the character information modeled in the modeling unit 500. Information on 10 HMM models that are trained 50 times for every number is stored and managed. The HMM based recognition device receives input character (number) image regardless of the length of the numeral string and recognizes the number through a corresponding model from models of the database unit 600.

Further, a method that recognizes the pre-processed character information using the modeling information represented by a numeral string by applying a weight to a structural feature point including the end point, the divergence point, and the curved point of character information in accordance with a predetermined algorithm uses a trained modeled information trained by the algorithm according to an exemplary embodiment of the present invention to make the input character image as a numeral string according to the method of sequencing the character information according to the exemplary embodiment to recognize the character through the corresponding model.

The method of sequencing character information according to the exemplary embodiment of the present invention may be implemented in a computer readable recording medium as a computer readable code. The computer readable recording medium includes all kinds of recording devices in which data readable by a computer system is stored.

The embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of sequencing character information, comprising:
  a pre-processing step in which a pre-processing unit extracts character information from an image to binarize the extracted character information through a predetermined threshold value and thins the binarized character information to be information having lines with a predetermined thickness;
  a step in which a normalizing unit normalizes the character information pre-processed in the pre-processing step to character information according to a predetermined criteria; and
  a sequencing step in which a sequencing unit converts the normalized character information into information numeralized using structural features including an end point or a divergence point of the character information.

2. The method of claim 1, wherein the normalizing of the character information includes:
  a step in which an end point code assigning unit detects an end point of a character stroke having one adjacent point among points configuring the pre-processed character information; and
  a step in which a character information rotating unit corrects an inclined angle of the character information using the detected end point in accordance with a predetermined direction.

3. The method of claim 2, wherein the step of detecting the end point includes:
  a step in which the end point code assigning unit assigns an end point code to the end point detected from the character information; and
  a step in which the end point code assigning unit sets a visiting order of end points according to a predetermined order for end points to which the end point codes are assigned.

4. The method of claim 3, further comprising: before the step of sequencing using the structural feature,
  a step in which the code assigning unit assigns a chain code that indicates a heading direction of a stroke or a divergence point that indicates the crossing of the strokes to each of points configuring the normalized character information,
  wherein in the step of sequencing, the sequencing unit sequences the character information to which the code or the point is assigned using the structural feature.

5. The method of claim 4, wherein the chain code or the divergence point is assigned such that the code assigning unit visits each of the points configuring the character information in accordance with a predetermined visiting order to assign the chain code or the divergence point to the detected end points.

6. The method of claim 5, wherein the chain code or the divergence point is assigned such that when no end point is detected in the step of detecting the end point, the code assigning unit visits the points using a point that is positioned relatively at a left-upper most side, among the points included in the character information, as a starting point in accordance with a predetermined visiting order to assign the chain code or the divergence point.

7. The method of claim 6, wherein the points of the character information are visited in accordance with the set or determined visiting order such that the code assigning unit visits continuous points to the starting point using a depth first search method that a point whose relative position is the left-upper most has a priority.

8. The method of claim 6, wherein in the step of assigning the chain code or the divergence point, the code assigning unit assigns a curved point to a visited point when an angle formed by a current heading direction of a stroke and a subsequent heading direction of the stroke is larger than a predetermined threshold value with respect to the visited point in accordance with the visiting order.

9. The method of claim 8, wherein the angle that is compared with the threshold value is a smaller angle of angles formed by the current heading direction of the stroke and the subsequent heading direction of the stroke.

10. The method of claim 2, wherein in the step of correcting the inclined angle, a character information rotating unit rotates the character information in a direction where an angle formed by a reference point and predetermined n directions using one of the detected end points as the reference point is minimized.

11. The method of claim 1, wherein the sequencing step includes:
   a structural feature code setting step in which a structural feature code generating unit sets a numeral code corresponding to an end point code, a divergence point or a curved point assigned to the structural feature of the character information; and
   a numeral string generating step in which a numeral string generating unit generates a structural feature code which is converted into a numeral string by applying a weight to the set structural feature code.

12. The method of claim 11, wherein in the structural feature code generating step, the structural feature code generating unit sets the structural feature as the numeral code in accordance with a predetermined numeralization representation method.

13. The method of claim 11, wherein in the numeral string generating step, the numeral string generating unit sequences the numeral code assigned to the character information in accordance with the visiting order to generate a numeral string.

14. The method of claim 13, wherein the weight is applied in the numeral string generating step such that the numeral string generating unit repeats the numeral codes set for the structural feature of the generated numeral string using a distance between the structural feature positions.

15. The method of claim 1, further comprising:
   a modeling step in which a modeling unit generalizes a numeral string for the character information using the numeral string generated in the sequencing step.

16. An apparatus of sequencing character information, comprising one or more processors configured to embody a plurality of functional units including:
   a pre-processing unit configured to extracts character information from an image to binarize the extracted character information through a predetermined threshold value and thins the binarized character information to be information having lines with a predetermined thickness;
   a normalizing unit configured to normalizes the character information pre-processed in the pre-processing unit to character information according to predetermined criteria;
   a code assigning unit configured to assigns a chain code that indicates a heading direction of a stroke or a divergence point that indicates the crossing of the strokes to each of points configuring the normalized character information; and
   a sequencing unit configured to converts the character information to which the code or the point is assigned into information numeralized using structural features including an end point or a divergence point of the character information.

17. The apparatus of claim 16, wherein the normalizing unit includes:
   an end point code assigning unit that detects an end point of a character stroke having one adjacent point among points configuring the pre-processed character information to assign an end code; and
   a character information rotating unit that corrects an inclined angle of the character information in accordance with a predetermined angle using an end point to which the end point code is assigned.

18. The apparatus of claim 16, wherein the sequencing unit includes:
   a structural feature code generating unit that sets a numeral code corresponding to an end point code, a divergence point, or a curved point that is assigned for the structural feature of the character information; and
   a numeral string generating unit that applies a weight to the generated structural feature code to generate a structural feature code which is converted into a numeral string.

19. The apparatus of claim 16, further comprising:
   a modeling unit that generalizes a numeral string for the character information using the numeral string generated in the sequencing step.

20. A method of recognizing character information, comprising:
   a step in which a character information inputting unit receives image information including character information;
   a pre-processing step in which a pre-processing unit extracts character information from the input image information to binarize the extracted character information through a predetermined threshold value and extract and thin a center line of the binarized character information; and
   a step in which a character information recognizing unit applies a weight to a structural feature point including an end point, a divergence point, and a curved point to convert the character information into numeral string information in accordance with a predetermined algorithm to recognize the pre-processed character information using trained modeling information.

* * * * *